United States Patent [19]

Stephenson

[11] Patent Number: 5,473,404
[45] Date of Patent: Dec. 5, 1995

[54] ZOOM CAMERA HAVING ELECTRONIC EXPOSURE CONTROL

[75] Inventor: Stanley W. Stephenson, Spencerport, N.Y.

[73] Assignee: Eastman Kodak Company, Rochester, N.Y.

[21] Appl. No.: 209,757

[22] Filed: Mar. 10, 1994

[51] Int. Cl.$^6$ ................................................ G03B 7/097
[52] U.S. Cl. ..................... 354/412; 354/195.12
[58] Field of Search ................................. 354/410, 413, 354/420, 419, 446, 402, 195.11, 195.12

[56] References Cited

U.S. PATENT DOCUMENTS

| 5,335,041 | 8/1994 | Fox | 354/402 |
|---|---|---|---|
| 5,357,308 | 10/1994 | Goo | 354/400 |

Primary Examiner—Michael L. Gellner
Assistant Examiner—Matthew Miller
Attorney, Agent, or Firm—C. J. Fildes & Co.

[57] ABSTRACT

A photographic camera for taking photographs of a scene having a film speed determining system, an electronically controllable picture taking lens that can be positioned to a plurality of lens focal lengths, a lens selection system for operation by the camera user to select one of the lens focal lengths at which the user wants the picture taking lens to be positioned, and a light sensing system that detects the amount of ambient light illuminating the scene, includes a controller responsive to film speed, available ambient light, and light gathering capacity of the picture taking lens at a selected lens focal length, for determining if the photograph will be underexposed at the selected lens focal length and inhibiting the taking for underexposed photographs.

10 Claims, 2 Drawing Sheets

ZOOM CAMERA HAVING ELECTRONIC EXPOSURE CONTROL

FIELD OF THE INVENTION

This invention relates to a photographic camera having a zoom function for changing a focal length of a multiple focal length lens and more specifically to a camera that controls picture taking or zooming of the lens in response to film speed and conditions of a photographic scene to inhibit the taking of underexposed pictures at a given lens focal length.

BACKGROUND OF THE INVENTION

In a camera having a zoom function, a series of optical elements are disposed in a movable arrangement so as to vary the optical field of coverage. Ambient light gathered through an adjustable focal length lens is focused onto film to capture a photographic image. The 35 mm format film standard is the most commonly used image capture area. In such a camera, the adjustable focal length of the adjustable focal length lens can typically be varied in the range between 25 mm to over 100 mm. However, the amount of light passing through the lens decreases for a given lens aperture diameter as the lens focal length increases. This reduction in light passing through the lens is most pronounced in low-light photography. The reduced light transmission can result in underexposed photographs.

When the adjustable focal length lens is designed for the camera, the maximum diameter of the optical path defines the light gathering capacity of the lens. For example, in a camera with a maximum lens aperture of 7 mm, the amount of light transmitted at maximum aperture when the lens focal length is at 35 mm (a lens/aperture ratio commonly referred to as an f-stop of f/5) is twice the amount of light transmitted when the lens focal length is at 70 mm (a ratio commonly referred to as f/10). This change in light transmission might not be appreciated by all photographers, and photographs with incorrect exposure can be the result. If the f-stop becomes too large, image capture under low-light conditions becomes difficult without large auxiliary light sources. It is especially easy for the unwary photographer to select a long focal length without realizing the extent to which light transmission has been reduced. The problem can be overcome by increasing light path diameter, but this leads to unnecessarily large lens apertures at short focal lengths.

Cameras with flash units provide artificial scene illumination to help prevent underexposed photographs. Automatic exposure systems are known and used to adjust exposure and activate flash units, when necessary, without intervention by the camera user.

Even with automatic exposure systems and flash units, accidental underexposed photographs may still occur especially at longer lens focal length settings, where there is greatly reduced light transmission. Some cameras automatically select a shorter focal length, based on selected focal length and lighting conditions alone, other cameras operate to increase exposure time in low-light conditions.

A trend in the camera industry has been to minimize the size of the camera by minimizing the diameter of the adjustable focal length lens. However, the minimized diameter of the lens reduces its light gathering capability. On cameras having flash units and a relatively small maximum aperture, the effective flash distance is reduced as the lens is zoomed under low-light conditions. This problem increases as slower speed films are used.

Conventional films used to capture the photographic image vary in speed from ISO 64 to ISO 1000. The 35 mm format film standard incorporates a film canister that can be filled with film having any of these speeds. The camera responds to the film speed through operator input or by sensing information encoded on the 35 mm canister and the camera is typically designed to incorporate both slow and fast speed films. If the camera is provided with a flash unit, the flash unit must provide sufficient illumination for use with slower speed films. Typically, the flash unit is larger than needed for use with higher speed films.

Cameras which combine compactness, an adjustable focal length lens, or use only high speed film lose low-light picture taking capability when lower speed films are used. One known camera designed for ISO 400 film includes a 25 to 75 mm adjustable focal length lens and has a light gathering aperture of 10 mm. Maximum f-stop for this camera is 2.5 at 25 mm focal length and 7.5 at 75 mm. The camera includes a flash unit sized to a 6 foot range, allowing for acceptable exposure (2 stops under) out to 12 feet. The flash unit has a guide number (at ISO 400 ) of 15 at 25 mm focal length, and 45 at 75 mm focal length. If ISO 100 film is placed in the camera, the required guide number functionally doubles to 30 and 90 respectably at ISO 400. Since guide numbers are typically expressed at ISO 100, the required guide number for the flash system for ISO 100 film would range from 7.5 to 22.5 using ISO 400 film and 15 to 45 for ISO 100 film.

This situation presents a problem in sizing a flash unit for a camera that accepts various speed films. If the flash unit is sized to an intermediate guide number of 30 at ISO 100, the unit is oversized for ISO 400 film and undersized for ISO 100 film at the longer focal length of 75 mm. A flash unit sized to accommodate all speeds of film at all focal lengths exceeds the limit of comfortable size for conventional camera designs.

Advanced cameras are electrically controlled and a series of control subprograms are executed to control camera operation. The control subprograms operate on information supplied from a light sensor and film speed sensor to control exposure of the film and have been used to vary the turn on light level for an electronic flash. In addition, the control subprogram has been used to control the shutter speed and aperture of the camera. A conventional exposure control subprogram operates on film speed, shutter speed and maximum aperture parameters to achieve best film exposure given the camera capacity. Cameras having better values for the parameters have a high price and large size. No camera systems consider film speed, shutter speed and aperture parameters as well as light levels and focal length to control exposure.

SUMMARY OF THE INVENTION

The present invention solves the above stated problems by providing a photographic camera comprising a body, means for determining the speed of film loaded into said camera body, a zoom taking lens that can be positioned to a plurality of focal lengths, positioning means for positioning said zoom lens to a selected focal length, and light sensing means for detecting the amount of ambient light available for illuminating the scene, is characterized by:

a control means responsive to said film speed sensing means, said light sensing means, and said positioning means, for determining if the photograph will be underexposed at a selected lens focal length.

In a preferred embodiment, the present invention provides a photographic camera having a film speed determining system, an electronically controllable picture taking lens that can be positioned to a plurality of lens focal lengths, a lens selection system for operation by the camera user to select one of the lens focal lengths in which the user wants the picture taking lens to be positioned, and a light sensing system that detects the amount of ambient light illuminating the scene. The camera further includes a controller that responds to film speed, available ambient light, and light gathering capacity of the picture taking lens at a selected lens focal length for determining if a photograph taken at the selected lens focal length will be underexposed.

If the controller determines that a photograph taken at the selected lens focal length will be underexposed, the camera will respond to the exposure conditions by inhibiting picture taking at the user selected lens focal length. Alternatively, the camera will respond by reducing the lens focal length selected by the user by an incremental amount to an acceptable focal length with more light gathering ability.

In another embodiment, the camera can include a flash unit that can be activated to provide artificial scene illumination when the controller determines that additional illumination is necessary.

These and other features and advantages of the present invention will be more fully understood from the following detailed description of the invention taken together with the accompanying drawings.

DETAILED DESCRIPTION OF THE INVENTION

Figure 1:
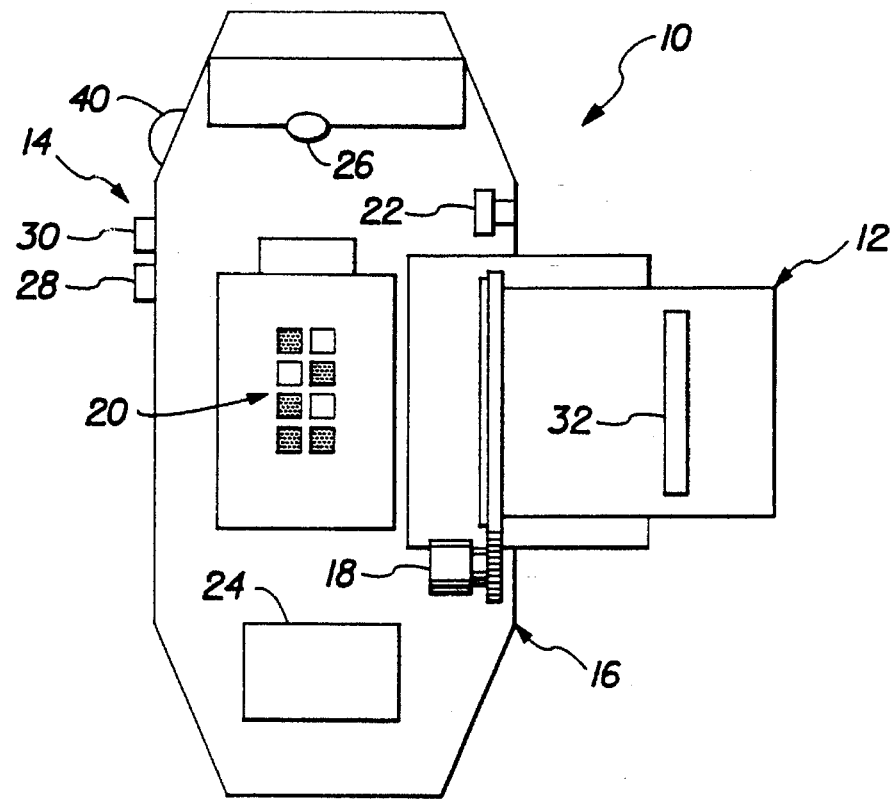
FIG. 1 is a schematic plan view of a camera constructed in accordance with the present invention.

Referring now to the drawings in detail, reference numeral 10 is used generally to indicate a camera constructed in accordance with the present invention by which a user can take photographs of a scene through an adjustable focal length or zoom lens 12. The operational features of photographic cameras in general are known and only those features pertaining to the present invention are discussed in detail herein. The user can select a desired lens focal length by operating a zoom control 14 on the body 16 of the camera to drive a zoom motor 18 to position the lens 12 relative to the camera body. Inputs from a film speed detector 20, an available light sensor 22, and the zoom control 14, which relays the light gathering capacity of the lens 12 at the selected focal length, are communicated to a controller 24 that determines whether a photograph at the selected lens focal length will be underexposed. If the controller 24 determines that there is insufficient light to make an exposure at the selected lens focal length, a signal is sent to a zoom back indicator 26 to alert the user of the low-light condition and the user is prohibited from taking a picture. In another embodiment, a signal is sent to the zoom motor 18 and the zoom motor is driven an incremental amount to reduce the lens focal length to prevent underexposure as hereinafter more fully described.

Figure 2:
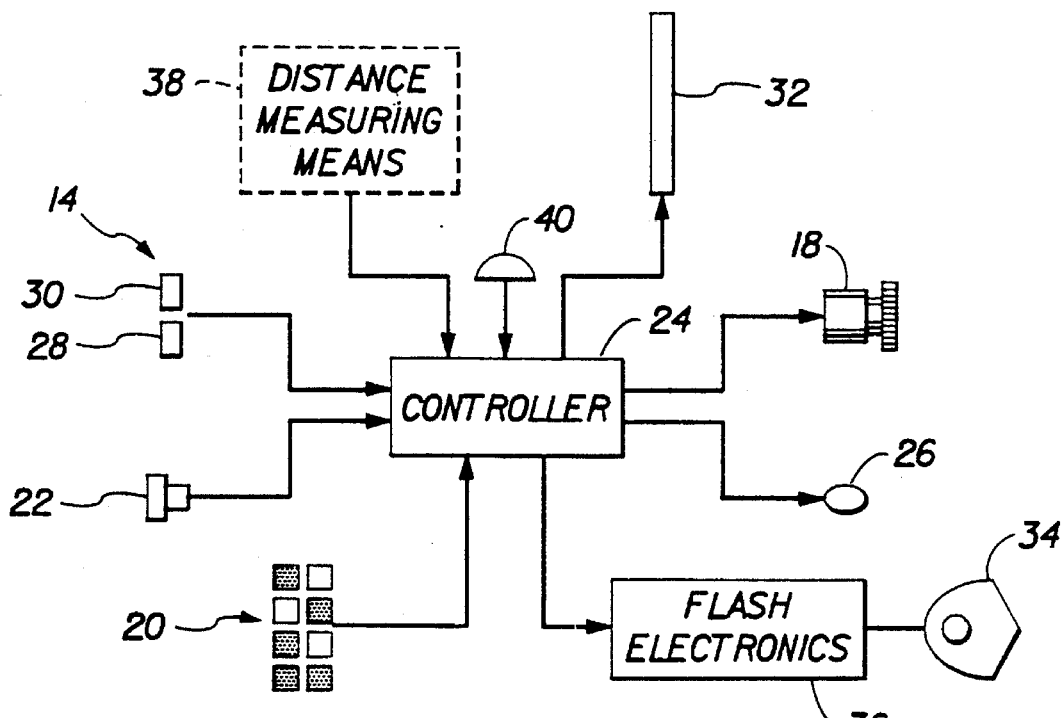
FIG. 2 is a functional diagram of the camera illustrated is FIG. 1.

FIGS. 1 and 2 of the drawings illustrate the functional components of the camera 10 and the relationship between the components. As described above, the camera user selects a lens focal length by operating zoom control 14. Zoom control 14 includes a first input switch 28 indicating to the controller 24 that the focal length should be increased and a second input switch 30 indicating that the focal length should be decreased. Switches 28 and 30 are exclusive and only one of the switches can be activated during a time period.

Inputs from switches 28 and 30 are communicated to controller 24 and subsequently to zoom motor 18 to reversibly drive the zoom motor in a clockwise or counter clockwise direction. Conventional mechanical elements such as gears and levers translate zoom motor 18 rotation into an outward or inward motion of lens 12 relative to the camera body 16. Lens 12 is mechanically stopped between maximum and minimum focal length positions. The position of lens 12 between the maximum and minimum focal length positions can be determined by counting time periods from an original start position of the lens. Alternatively, an encoder such as a mechanically variable resister can be used to indicate lens 12 position. Lens 12 includes an aperture mechanism 32 which are conventionally known for increasing or decreasing the lens aperture diameter to increase or decrease the light aperture. The camera also includes a shutter release button 40 which is in communication with controller 24 and serves to control the shuttering of lens 12 as is conventionally known.

The light sensor 22 for sensing available light will now be described. One type of light sensor 22 is a cadmium sulfide detector that varies resistance with a sensed ambient light level. Other suitable detectors are commercially available. Light sensor 22 is mounted on camera body 16 and is directed to sense ambient light levels toward the center of the image capture area. Sensor 22 is in communication with controller 24 and communicates the value of the sensed light level to the controller. This information is acted on by the controller 24. In cameras having a flash unit 34, the controller 24 responds to the information by communicating with flash electronics 36 which are conventionally known to control the flash and reduce the light aperture via parallel communication with aperture mechanism 32.

Film speed detector 20 includes a series of flexible metal electrical contacts (not shown) disposed in the camera body 16 which contact the exterior surface of a film canister (not shown) in predefined areas. In 35mm format film, the film canister includes a series of areas predefined to indicate the light sensitivity (ISO) of the film in the canister. This film speed coding, referred to as DX coding, incorporates information on film speed and latitude. The film speed detector 20 in communication with controller 24 senses the DX code on the film canister and then communicates the film speed thereto. The details of the operation of film speed detection are described in U.S. Pat. No. 4,693,574 among others.

Inputs received by controller 24 from the zoom control 14, light sensor 22 and film speed detector 20, together with the known maximum aperture of the lens 12, which provides a limit on the lowest level of illumination capturable by the camera, are used to inhibit the taking of underexposed photographs. The controller 24, through control electronics, provides an optimum exposure of the film, based on the film speed.

Figure 3:
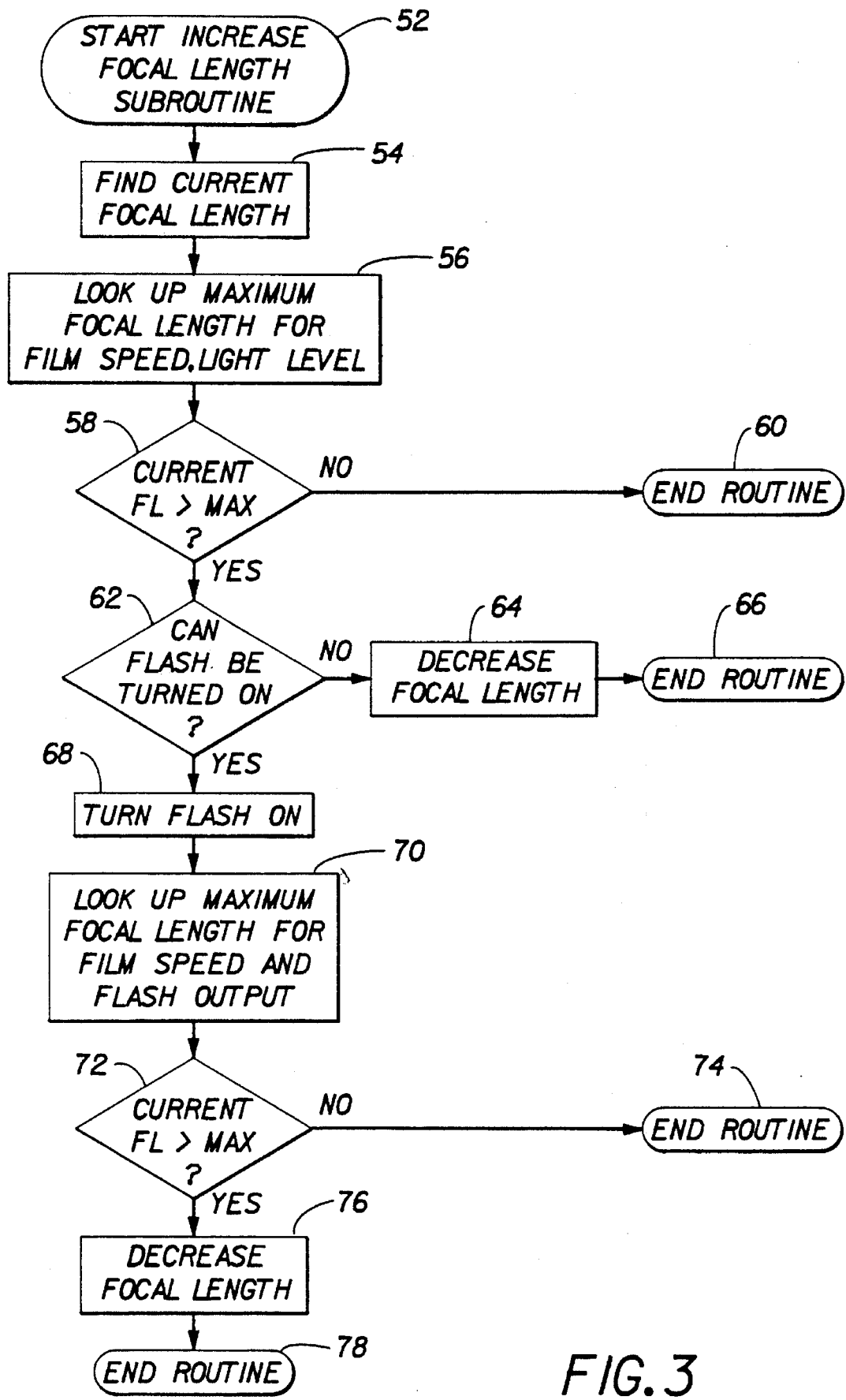
FIG. 3 is a flow chart illustrating the operation of the camera in accordance with the invention.

The operation of the camera 10 will be described further with reference to the flow chart illustrated in FIG. 3, which shows the operating steps of camera 10 after the camera has been turned on, the controller 24 is in an operating mode, and the user initially selected a lens focal length, step 52.

When camera 10 is turned on, lens 12 is at an initial lens position and focal length. The user operates switches 28 and 30 as hereinabove described to operate zoom motor 18 to select a lens focal length. Film speed is detected from the film canister by the film speed detector 20. The selected lens focal length relative to the initial camera turned on position of the lens 12 is determined from a lens position transducer or memory cell containing lens position. This focal length is scaled in step 54 to get a number corresponding to the maximum aperture value for the selected lens position. In step 56, the ambient light value and film speed are used to look up the maximum focal length without flash from a known look up table (not shown). The maximum focal length revealed for the ambient light level and film speed is compared to the selected lens focal length is step 58. If the selected lens focal length is less than the maximum focal length without flash, the routine is exited in step 60 and the camera is enabled for picture taking.

If in step 58 it is determined that the lens 12 does not have sufficient illumination to expose a photograph at the selected lens focal length, flash availability is determined in step 62. If the flash unit 34 is disabled, or the camera 10 does not have a flash unit, the zoom motor 18 is driven an incremental amount to reduce the focal length in step 64 and the routine is ended in step 66 to enable the camera 10 for picture taking.

If in step 62 it is determined that the flash unit 34 is available, the flash unit is enabled in step 68. In step 70 a second look up table (not shown) based on film speed and flash output is then examined to determine a new maximum focal length with flash. The selected lens focal length is compared to the new maximum focal length in step 72. If the selected lens focal length is less than the new maximum focal length, the routine is exited in step 74 and the camera 10 is enabled for picture taking. Otherwise, the focal length is incrementally reduced in step 76 to enable the camera 10 for picture taking and the routine is exited in step 78.

The incremental reduction in lens focal length or zoom inhibit can be executed separately from the zoom control-motor routine that normally controls the focal length of the lens 12. Preferably, the incremental reduction of the lens focal length from the zoom inhibit is Greater than the incremental increase in the focal length from the zoom routine. With this greater decrement, the net motion of the lens decreases the focal length of the lens under low light conditions, even if the user is trying to drive the lens 12 to a greater focal length.

Alternatively, registers are operated on during the loop, and a final section of the code resolves actuation parameters based on register contents. In this case the aperture zoom inhibit and zoom actuation routines would operate on common registers in a manner that does not cause the lens to jitter between a forward zoom motion, and then a greater zoom reduction.

The speed of program execution by controller 24 is typically faster than changes in scene illumination, preventing underexposure due to telephoto lens extension.

In a camera having a flash unit, controller 24 is responsive to flash unit output. Additionally, in cameras having distance sensing means, referenced 38 and illustrated in phantom in FIG. 2, the lens aperture can be adjusted by the control electronics based on distance to the photographic subject. In cameras without distance sensing means, picture taking can be inhibited by disabling the shutter release button 32 or limited as information is gathered by light sensor 22. If insufficient light is available, the controller 24 drives zoom motor 18 to reduce the selected lens focal length but in addition, controller 24 activates the flash unit 34 to provide artificial scene illumination.

Although the present invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

PARTS LIST 10. camera
12. zoom lens
14. zoom control
16. camera body
18. zoom motor
20. film speed detector
22. light sensor
24. controller
26. zoom back indicator
28. first input switch
30. second input switch
32. aperture mechanism
34. flash unit
36. flash electronics
38. distance sensing
40. shutter release button means
52. step
54. step
56. step
58. step
60. step
62. step
64. step
66. step
68. step
70. step
72. step
74. step
76. step
78. step

What is claimed is:

1. A photographic camera comprising a body, means for determining the speed of film loaded into said camera body, a zoom taking lens that can be positioned to a plurality of focal lengths, positioning means for positioning said zoom lens to a selected focal length, and light sensing means for detecting the amount of ambient light available for illuminating the scene, is characterized by:

a control means responsive to said film speed sensing means, said light sensing means, and said positioning means, for determining if the photograph will be underexposed at a selected lens focal length.

2. A camera as recited in claim 1 wherein said control means includes inhibit means for inhibiting operation of said camera when said control means determines a photograph will be underexposed at the selected lens focal length.

3. A camera as recited in claim 1 including drive means for controllably changing the focal length of said zoom taking lens wherein said control means is in communication with said drive means so as to incrementally control the selected lens focal length so a properly exposed photograph can be properly taken.

4. A camera as recited in claim 1 including a flash unit for providing artificial scene illumination, wherein said control means is responsive to the light output of said flash unit for determining if the photograph will be underexposed if said flash unit is operated, and in that said control means includes means for controlling the activation of said flash unit.

5. A method of making photographic exposures in a camera comprising a film speed determining system, an electronically controllable picture taking lens that can be positioned to a plurality of lens focal lengths, a lens selection system for operation by the camera user to select one of the lens focal lengths at which the user wants the picture taking lens to be positioned, and a light sensing system that detects the amount of ambient light illuminating the scene, the method characterized by:

selecting a lens focal length;

sensing available ambient light and light gathering capacity of the picture taking lens at the selected lens focal length;

sensing film speed;

determining the maximum focal length of the picture taking lens based on ambient light value and film speed;

comparing the maximum focal length with the selected lens focal length; and determining if the photograph will be underexposed at the selected lens focal length.

6. The method as recited in claim 5 further including the step of preventing picture taking when it is determined that the photograph will be underexposed at the selected lens focal length.

7. The method recited in claim 5 further including the step of changing the focal length of the taking lens to reduce the selected lens focal length so a photograph taken will be properly exposed.

8. The method recited in claim 5 further including the step of providing artificial scene illumination if it is determined that the photograph will be underexposed at the selected lens focal length.

9. The method recited in claim 5 further including the steps of changing the focal length of the picture taking lens to reduce the selected lens focal length so a photograph taken will be properly exposed; and providing artificial scene illumination if the photograph will be underexposed at the reduced focal length.

10. The method recited in claim 5 further including the steps of sensing the distance between the camera and the photographic subject; and adjusting the lens aperture based on said distance.

\* \* \* \* \*